March 24, 1970 K. D. KLEIN ET AL 3,502,340

AUTOMATIC TAPE HEAD INDEXING DEVICE

Filed April 17, 1967

INVENTORS
KENNETH D. KLEIN
ROBERT A. WOLF
BY Mueller, Aichele & Rauner
ATTORNEYS.

3,502,340

AUTOMATIC TAPE HEAD INDEXING DEVICE

Kenneth D. Klein, Bloomingdale, and Robert A. Wolf, Oak Lawn, Ill., assignors to Motorola, Inc., Franklin Park, Ill., a corporation of Illinois Filed Apr. 17, 1967, Ser. No. 631,483
Int. Cl. G11b *21/12, 21/08*
U.S. Cl. 274—4 10 Claims

ABSTRACT OF THE DISCLOSURE

This device uses a sensing switch operated by the removal of a cartridge from a cartridge-type tape player to energize a solenoid for automatically rotating a cam to position the tape head to a selected track on the tape. A cycle switch operated by the solenoid momentarily de-energizes the solenoid to allow the armature to return to the extended position to complete a cycle of rotation of the cam. A track sensing switch operates when the head is positioned to the first track of the tape to de-energize the solenoid.

CROSS REFERENCE TO RELATED APPLICATIONS

Reference is made to application Ser. No. 520,169, filed Jan. 12, 1966, and assigned to the assignee of this application which describes a cartridge-type tape player.

BACKGROUND OF THE INVENTION

This invention pertains generally to a sound head indexing device for electronic apparatus using multi-track tape and more particularly to apparatus for automatically indexing the sound head of a cartridge-type multi-track tape player to a desired track.

A source of annoyance in the past for operators of cartridge-type tape players using cartridges having multi-track tape therein has been that when a cartridge is removed from the player and another cartridge inserted in its place, the tape head is aligned to the same track in the latter cartridge as it was aligned to in the former one. Furthermore, it has generally not been possible to position the sound head to a desired track on the tape prior to operating the tape player.

SUMMARY

It is an object of this invention to provide a device for electronic apparatus using multi-track tape that permits indexing of a head assembly to a selected track on the tape.

It is another object of this invention to provide for automatic indexing of the magnetic sound head in a cartridge-type tape with the removal of the cartridge.

In one embodiment of this invention, a cartridge-type tape player adapted to receive and play cartridges containing multi-track tape, utilizes a cam follower coupled to a magnetic sound head assembly for positioning the assembly to play the different tracks on the tape. The cam follower is positioned by a cam device that has a plurality of different cam surfaces each surface being associated with a different track on the tape. The solenoid is coupled to the cam device and rotates the same to position the different cam surfaces in contact with the cam follower. A cartridge sensing switch is coupled between the cam device and the solenoid and is actuated by removal of a cartridge from the apparatus to couple a potential to the solenoid to energize it thereby rotating the cam device. A cycle switch is operated by the solenoid to temporarily remove the potential therefrom to permit the solenoid plunger to return to the extended position. The cam device is cyclically rotated in this manner to position the head to the different tracks on the tape until a track sensing switch coupled either to the cam device or to the head assembly is actuated, by the positioning of the head assembly to the selected pair of tracks. When actuated, the track sensing switch de-energizes the solenoid thereby indexing the head to the selected pair of tracks.

DETAILED DESCRIPTION

Figure 1:
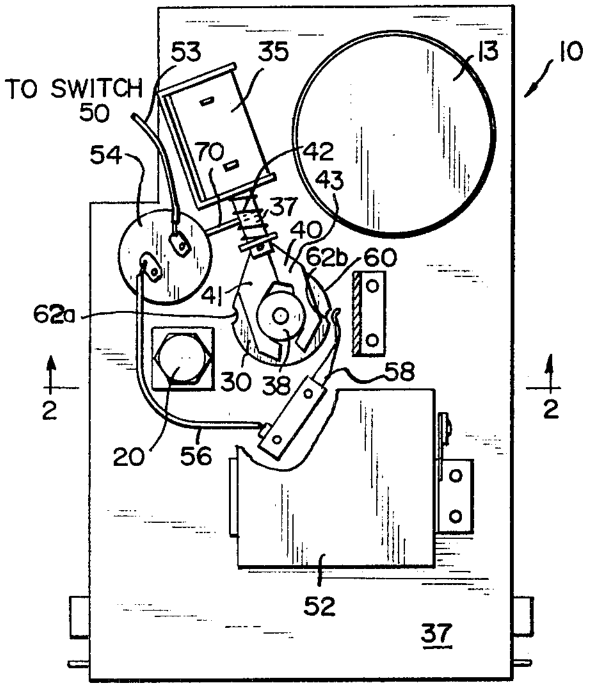
FIG. 1 is a bottom plan view of a cartridge-type tape player illustrating the device in accordance with this invention.
Figure 2:
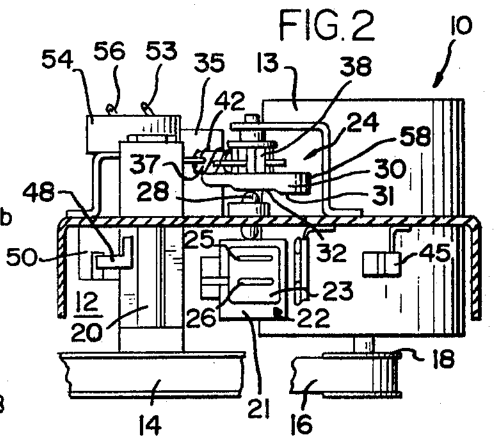
FIG. 2 is a front elevation cross-sectional view taken generally along the line 2—2 of FIG. 1.

Referring to the figures of the drawing, FIGS. 1 and 2 illustrate a stereophonic, cartridge-type tape player 10 that is adapted to receive and play cartridges, having multi-track tapes therein, in the chamber 12. A motor 13 drives the flywheel 14 through a belt 16 driven by pulley 18. Flywheel 14 drives the capstan shaft 20 in the known manner to move the tape in the cartridge past the magnetic tape head or sound head assembly 22 which includes the heat mounting assembly 21 and the head 23. The tape used in this example has four stereo pairs of recorded tracks thereon or eight recorded tracks altogether. The head assembly 22 is positioned by a pancake cam mechanism 24 so that the two playback portions 25 and 26 on the head 23 are aligned with two tracks on the tape that form a stereo pair.

The head assembly 22 is positioned between the different tracks on the tape by the cam device 24 which is coupled through cam follower 28 to the head asesmbly 22. The cam 30 has a plurality of different cam surfaces such as 31 and 32, and each different cam surface is associated with a different pair of tracks on the tape. A solenoid 35 is mounted to the bottom 37 of the tape player 10 and is energized to rotate the cam device 24 to position the head assembly 22 to the tracks on the tape through cam follower 28.

The solenoid armature 37 is coupled to a toothed gear 38, which is connected to the cam 30 by a pawl mechanism 40. The pawl 40 has first and second members 41 and 43 and rotates the toothed gear 38 to move cam 30 through one-half of the desired movement, when the armature is drawn into the solenoid 35 upon it being actauted. When the solenoid 35 is de-energized, the armature 37 returns to the extended position because of spring 42. This action rotates the toothed gear 38 the remaining amount to complete a cycle of movement for cam 30 thereby positioning a different cam surface in contact with the cam follower 28.

At the end of each track on the tape there is a contact strip which is a good electrical conductor. When this material crosses the contacts 45 (FIG. 2) the contacts are closed coupling a potential from a battery, for instance, through the solenoid 35 and contacts 45 to a reference potential thereby pulling the solenoid armature 37 into the solenoid 35. When the conducting material passes the contacts 45, the circuit to the reference potential is broken, and the spring 42 returns the armature 37 of solenoid 35 to its extended position thereby completing a cycle of rotation of the cam 30 to position a different cam surface in engagement with the cam follower 28 thereby positioning the head mechanism 22 to the next pair of tracks.

Figure 3:
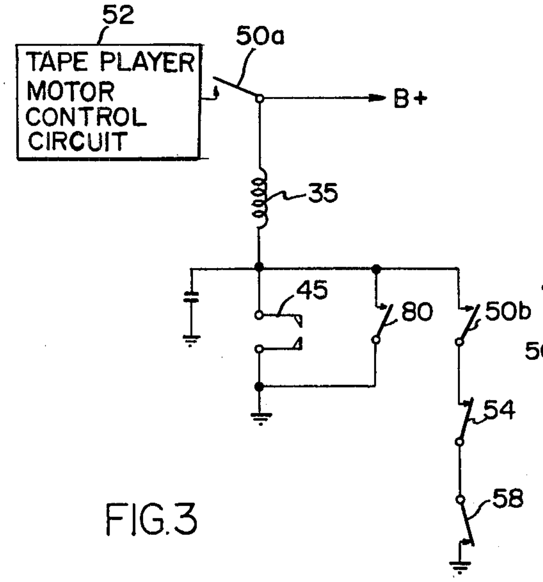
FIG. 3 is a schematic circuit diagram illustrating operation of the device in accordance with this invention.

A switch 50 which can be, for instance, a single pole double throw switch, has a contact 50*a* (FIG. 3) for energizing the tape motor control circuit 52 and contact 50*b*, which acts as a cartridge sensing switch. Actuating switch 50 by inserting a cartridge into the player closes contact 50*a* of the switch to couple battery potential to the tape player motor 13 through motor control circuit 52 and opens the cartridge sensing contact 50*b* of the switch. Likewise, when the cartridge is removed, contact 50*a* is opened to de-energize the motor circuit, and contract 50*b* or the cartridge sensing switch is closed. Closing the cartridge sensing switch 50*b*, couples battery potential through lead 53 to the solenoid cycle switch 54 which is a normally closed switch. The potential is coupled from the solenoid cycle switch 54 by lead 56 to a resilient contact arm 58. The arm 58 is normally biased into engagement with the periphery 60 of the cam device 30 so that the potential is coupled to a reference potential through the cam, which acts as a mechanical ground. On the periphery 60 of the cam device 30, however, are notches 62A and 62B. At some point during the rotation of the cam 30 one of the notches 62*a* or 62*b* will be aligned with the resilient contact arm 58. When this happens the contact arm 58 will no longer engage the cam 30, as shown in FIG. 1, breaking the coupling between the solenoid 35 and ground reference potential.

Figures 4, 5:
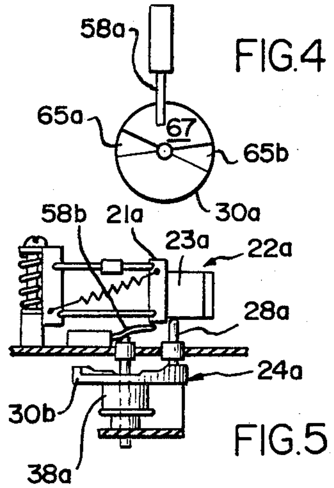
FIG. 4 is a top plan view of a second embodiment of a first portion of the device illustrated in FIG. 1.
FIG. 5 is a side elevation view of a third embodiment of the first portion of the device shown in FIG. 1.
Figure 6:
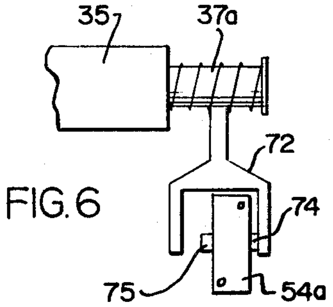
FIG. 6 is a top plan view of a second embodiment of a second portion of the device shown in FIG. 1.

FIG. 4 illustrates a second embodiment that could be used to provide the same cooperation between contact arm 58 and cam 30. In this embodiment the cam 30*a* has two recessed portions 65*a* and 65*b*. The contact 58*a* normally engages the upper surface 67 of the cam 30*a* to complete the mechanical ground through the cam. However, when one of the recessed portions 65*a* or 65*b* is aligned with the contact arm 58*a* the coupling between the contact arm 58*a* and the cam will be broken to break the mechanical grounding of the arm.

It should be pointed out that the cams 30 and 30*a* only need four different cam surfaces to position the head mechanism 22 to the four different pairs of stereo tracks on the tape. However, like cam surfaces are provided 180° apart around the cam to shorten the amount of rotation of the cam necessary to position the sound head to a different pair of tracks. It is for this same reason that the notches 62 or recessed portions 65 are also placed on the cam 180° apart.

FIG. 5 illustrates a third embodiment which could be used for providing the mechanical ground and breaking action at some predetermined position of the head assembly 22 as described for the resilient contact arm 58. In this embodiment a resilient contact arm 58*b* is in contact with the head mounting assembly 21*a*. The head 23*a* is positioned to the various pairs of stereo tracks by the cam device 24*a* as was previously explained. In this arrangement, the resilient arm 58*b* is biased into contact with the head mounting assembly 21*a* to provide a mechanical ground except when the head is positioned to the pair of tracks corresponding to the highest position to which cam device 24*a* positions the head 23*a*. In this position, as shown in FIG. 5, the resilient contact arm will no longer engage the tape head mounting assembly 21*a* so that the mechanical ground is broken, opening the circuit between the solenoid 35 and ground reference potential.

Other mechanical devices could be provided which operate off of the head mounting assembly 21. For instance, a simple ON–OFF switch which is normally closed to complete the ground connection through the switch itself, would be opened by a contact arm engaging the head mechanism at one point of the excursion of the head mounting assembly 21 between the different pairs of tracks on the tape. The excursion of the head would then move the switch to the off position thereby breaking the ground connection and opening the circuit between the solenoid 35 and ground reference potential.

The cycle switch 54 is coupled by the arm 70 to the armature 37 of solenoid 35. Switch 54 permits the solenid to complete a cycle of rotation of cam 30 by removing the potential from the solenoid when the armature has reached the end of its inward movement into the solenoid. The switch 54 is a simple ON–OFF switch which is normally closed and which is opened when the action of the armature being drawn into the solenoid moves the arm 70 to open the circuit between the battery and ground reference potential to permit the armature to return to its extended position. Switch 54 must remain open until the armature has properly reached its outward travel to index the head.

FIG. 5 illustrates a second embodiment of the cycle switch 54, and is a double contact lag switch 54*a* which is operated by a U-shaped bracket arm 72 connected to the solenoid armature 37*a* of solenoid 35. When the armature 37*a* is drawn into the solenoid, it strikes plunger 74 of switch 54*a* to open the circuit between battery potential and ground reference potential permitting the solenoid to return to its extended position. In the extended position, the U-shaped bracket strikes the plunger 75 to once again close the circuit to permit the solenoid to become energized again thereby providing a means for recycling solenoid 35.

A source of annoyance in previous tape players has been, for example, that an operator might insert a cartridge into the player and play that cartridge through two of the four stereo pairs of tracks thereon. At this point, if the operator withdrew the cartridge and inserted a different cartridge into the player, the head mechanism would be set to play the third pair of tracks on the tape when in fact the operator desired to play the first pair of tracks. The apparatus of this invention, however, alleviates this problem by providing for automatic indexing of the head assembly 22 to a desired pair of tracks on the tape.

In operation, when a cartridge is inserted into the chamber 12 of tape player 10, it closes contact 50*a* of switch 50 to energize the tape player motor 13 to drive the tape past the head 23 to reproduce the sound on the pair of tracks to which the head is positioned. When the cartridge is removed from the tape player, contact 50*a* is opened permitting the player to be de-energized. At the same time the cartridge sensing switch or contact 50*b* of switch 50 is closed completing the circuit from battery potential through solenoid 35, contact 50*b*, cycle switch 54, contact arm 58 and cam 30 to ground reference potential. Completing this circuit, energizes solenoid 35 which pulls armature 37 in to partially rotate cam 30, as described. When armature 37 of the solenoid arrives at the pulled in position, cycle switch 54 opens breaking the circuit to remove battery potential from solenoid 35 thereby permitting the armature 37 to be biased by spring 42 to its return or extended position to complete the rotation of the cam 30. If the resilient contact arm 58 is still in contact with the surface of the cam 30 the solenoid will recycle moving cam 30 once again to position the head to another pair of tracks. However, when one of the notches 62*a* or 62*b* are aligned with the contact arm 58, the ground connection will be broken removing battery potential from the solenoid 35 to stop the cam mechanism from further rotation. It is desirable to have the notches 62*a* and 62*b* aligned with the contact arm 58 to disable or de-energize the solenoid 35 when the head is positioned to the first pair of stereo tracks on the tape. Therefore, when a new cartridge is placed into the tape the head mechanism 22 will be positioned to play the first pair of tracks of the new tape.

If the embodiment shown in FIG. 5 is employed, the connection between the resilient arm 58*b* and the head mounting assembly 21*a* will be broken when the head 23*a* is moved to its uppermost position by cam device 24*a*, thereby de-energizing the solenoid 35. The uppermost position of the head 23*a* can be selected to correspond to the first pair of stereo tracks on the tape. Of course, other combinations are passible such has having connection between the resilient arm **58*b* and the head mounting assembly 21*a* broken with the head being moved to the lowermost position by the cam device 24*a***.

A manual detent switch 80 (FIG. 3) is also provided which may be operated by a remote button (not shown) located on or in the vicinity of the tape player. Manually pressing the detent button closes contact 80 to complete the circuit from the battery potential through solenoid 35 to ground, permitting the solenoid 35 to be actuated to move cam 30 through a partial cycle. When the button is released, switch 80 opens and the connection to ground reference potential is opened permitting the armature 37 to return to the extended position thereby completing the desired rotation of the cam 30 to position the head to the next pair of stereo tracks. Switch 80 can be operated without a cartridge being inserted into the player.

It can be seen, therefore, that when a cartridge is removed from the player and a new cartridge is inserted, the head mechanism 22 will be automatically indexed to the first pair of stereo tracks. However, should the operator desire to play, for instance, the third pair of stereo tracks, he would merely have to operate the manual detent button two times and the head mechanism 22 would then be positioned to the third pair of tracks.

What has been provided, therefore, is a device for automatically indexing the sound head of a magnetic tape player to a selected pair of stereo tracks on the tape and which also provides for manual operation to move the head between the different tracks on the tape.

We claim:

1. Apparatus for indexing a head assembly on the occurrence of a single predetermined event to a selected track position on a multi-track tape for use in an electronic device adapted to receive a container holding the multi-track tape, the apparatus including in combination, movable means coupled to the head assembly and being cyclically operable for stepping the same between the different track positions on the multi-track tape, operating means coupled to said movable means for cycling the same to step the head assembly to a different track position, switch means coupled to said operating means and being responsive to the single predetermined event to energize said operating means to cycle said movable means, cycle switch means coupled to said operating means and being responsive to the operation of said operating means by said switch means in response to the single predetermined event to actuate said operating means to continuously step the head assembly to the different track positions, and track sensing means responsive to the head assembly being stepped to a selected track position by the continuous cycling of said movable means to de-energize said operating means.

2. The apparatus of claim 1 wherein said switch means is responsive to removal of the multi-track tape container from the apparatus to energize said operating means.

3. The apparatus of claim 1 wherein said switch means includes circuitry for shunting said cycle switch means and said track sensing means, and a manual detent button coupled to said circuitry, said button being selectively actuable to energize said operating means to step the head assembly to a selected track position on the multi-track tape.

4. In a cartridge-type tape player that is adapted to receive and play cartridges containing multi-track tape, and having means for driving the tape past a sound head assembly, the head assembly including a cam follower coupled to the sound head and engaging a cam device having a plurality of different cam surfaces, each different cam surface being associated with a different track on the tape, and having a solenoid coupled to the cam device and being operable for rotating the same to position a different cam surface in engagement with the cam follower to position the sound head to play a different track of the multi-track tape, the combination including, a cartridge sensing switch coupled to the solenoid and being actuated by movement of the cartridge from the apparatus to couple a potential to the solenoid to energize the same, a cycle switch coupled to the solenoid, said cycle switch being operated by the solenoid upon movement of the cartridge from the apparatus to alternately remove and apply the potential from said sensing switch to the solenoid to continuously rotate the cam device to step the sound head to the different track positions, and track sensing means responsive to the sound head assembly being stepped to a predetermined track position to remove the potential from the solenoid.

5. The cartridge-type tape player of claim 4 wherein actuating said cartridge sensing switch couples the solenoid to a reference potential through said cycle switch, said cam device and said track sensing means to apply a potential thereto for energizing the same, wherein the cam device has a recessed portion on the surface thereof, and wherein said track sensing means includes a contact arm coupled to a reference potential and having a portion engaging the surface of the cam device to couple the same to the reference potential, said contact arm being aligned with the recessed portion of the cam device thereby being dis-engaged from the surface of the cam device with the sound head being positioned to a pre-selected track position so that the connection of the cam device with the reference potential is broken de-energizing the solenoid.

6. The cartridge-type tape player of claim 4 wherein said track sensing means includes a switching device for applying a potential to the solenoid, said switching device having an arm for selectively energizing the head assembly, said arm being operated by the head assembly with the sound head being positioned to a predetermined track position to de-energize the solenoid.

7. The cartridge-type tape player of claim 4 wherein the tape has four stereo pairs of recorded sound tracks thereon, and the cam device is of the pancake type having a face with four different cam surfaces thereon for positioning the sound head to each of the stereo pairs of tracks and a notch in the periphery thereof, wherein said cartridge sensing switch is operated by withdrawing the cartridge from the tape player to couple the solenoid to a reference potential through said cycle switch, said cam device, and said track sensing means to apply a potential thereto for energizing the same, and wherein said track sensing means includes a resilient contact arm coupled to a reference potential and riding on the periphery of the pancake cam to couple the same to the reference potential, said cycle switch being operated by the solenoid to alternately remove and connect the reference potential to the solenoid with said contact arm engaging the cam to continuously step the sound head to the different track positions, and said contact arm of said track sensing means being aligned with the notch in the cam breaking contact between said arm and the cam to disconnect the solenoid from the reference potential thereby de-energizing the same with the sound head being indexed to the first of the stereo pairs of recorded sound track positions and with the tape cartridge being removed from the player.

8. The cartridge-type tape player of claim 4 wherein movement of the cartridge from the apparatus actuates said carriage sensing switch to couple a potential to the solenoid through said cycle switch, said cam device, and said track sensing means to a reference potential for energizing the same, and wherein said cycle switch is coupled to the solenoid armature, said cycle switch being operated with the armature being pulled into the solenoid to break the coupling between said cartridge sensing switch and the reference potential thereby de-energizing the solenoid, said cycle switch being operated with said solenoid being de-energized and the armature thereof returning to the extended position to again couple the solenoid to the reference potential thereby continuously stepping the sound head to the different track positions until the selected track position is reached.

9. The cartridge-type tape player of claim 8 wherein said cycle switch includes a normally closed switch having an arm coupled to the solenoid armature, said arm being moved by the action of the armature being drawn into the solenoid to open said switch to remove the potential from the solenoid.

10. The cartridge-type tape player of claim 8 wherein said cycle switch includes a lag switch having first and second contacts and a U-shaped bracket arm coupled to the solenoid armature, said bracket arm having one leg of the U engaging the lag switch to close said first contact for coupling a potential to the solenoid, and said arm being moved by the action of the armature being drawn into the solenoid to engage the other leg of the U with the lag switch to close the second contact and open the first contact thereby removing the potential from the solenoid.

References Cited

UNITED STATES PATENTS

| | | | |
|---|---|---|---|
| 2,857,164 | 10/1958 | Camras | 179—100.2 |
| 3,056,302 | 10/1962 | Proctor | 179—100.2 |
| 3,400,227 | 9/1968 | Lear et al. | 179—100.2 |

BERNARD KONICK, Primary Examiner

R. S. TUPPER, Assistant Examiner

U.S. Cl. X.R.

179—100.2